United States Patent
Rossi et al.

(10) Patent No.: US 8,674,305 B2
(45) Date of Patent: Mar. 18, 2014

(54) OPTO-ELECTRONIC MODULE AND DEVICES COMPRISING THE SAME

(71) Applicant: Heptagon Micro Optics Pte. Ltd., Singapore (SG)

(72) Inventors: Markus Rossi, Jona (CH); Ville Kettunen, Ruschlikon (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days.

(21) Appl. No.: 13/926,058

(22) Filed: Jun. 25, 2013

(65) Prior Publication Data

US 2013/0284908 A1    Oct. 31, 2013

Related U.S. Application Data

(63) Continuation of application No. 13/720,645, filed on Dec. 19, 2012.

(60) Provisional application No. 61/699,687, filed on Sep. 11, 2012, provisional application No. 61/577,965, filed on Dec. 20, 2011.

(51) Int. Cl.
*G01S 17/08* (2006.01)
*G08B 13/181* (2006.01)

(52) U.S. Cl.
USPC ...................................... 250/341.8

(58) Field of Classification Search
USPC ...................................... 250/341.8
See application file for complete search history.

(56) References Cited

U.S. PATENT DOCUMENTS

| | | |
|---|---|---|
| 2008/0049210 A1 | 2/2008 | Takaoka |
| 2009/0067055 A1 * | 3/2009 | Yamamura ................ 359/622 |
| 2009/0159900 A1 | 6/2009 | Basoor et al. |
| 2010/0327164 A1 | 12/2010 | Costello et al. |
| 2012/0037793 A1 * | 2/2012 | Ong et al. ................ 250/216 |
| 2013/0075595 A1 * | 3/2013 | Ruh ................ 250/221 |

FOREIGN PATENT DOCUMENTS

DE        41 15 013 C1    5/1992
WO    WO 2009076788 A1 *   6/2009

OTHER PUBLICATIONS

European Patent Office, Search Report and Written Opinion in International Patent Application No. PCT/EP2012/005225 (dated Apr. 5, 2013).

Joe Smith et al., "TSL2771 I²C Communications and Proximity Algorithm," Texas Advanced Optoelectronic Solutions (TAOS), Intelligent Opto Sensor Designer's Notebook, No. 30A, pp. 1-9 (Aug. 2011).

(Continued)

*Primary Examiner* — Constantine Hannaher
(74) *Attorney, Agent, or Firm* — Fish & Richardson P.C.

(57) ABSTRACT

An opto-electronic module includes a detecting channel comprising a detecting member for detecting light and an emission channel comprising an emission member for emitting light generally detectable by said detecting member. Therein, a radiation distribution characteristic for an emission of light from said emission channel is non rotationally symmetric; and/or a sensitivity distribution characteristic for a detection in said detecting channel of light incident on said detection channel is non rotationally symmetric; and/or a central or main emission direction for an emission of light from said emission channel and a central or main detection direction for a detection of light incident on said detection channel are aligned not parallel to each other; and/or at least a first one of the channels comprises one or more passive optical components.

30 Claims, 6 Drawing Sheets

(56) References Cited

OTHER PUBLICATIONS

Kerry Glover, "Signal, Noise, Offset—TSL2771 Appendix," Texas Advanced Optoelectronic Solutions (TAOS), Intelligent Opto Sensor Designer's Notebook, No. 33.1 Appendix, pp. 1-3 (Aug. 2011).
Osram Opto Semiconductors GmbH, Application Note: "SFH 7773 (IR-LED + Proximity Sensor + Ambient Light Sensor)," pp. 1-23 (Dec. 12, 2011).
Silicon Laboratories, "Quicksense™ Si114x Gesture, Proximity and Ambient Light Sensor ICs," http://www.silabs.com/products/sensors (printed on Dec. 19, 2012).
Silicon Laboratories, "Si1141 Proximity/Ambient Light Sensor with I$^2$C Interface," Human Interface Products (Nov. 2010).
www.capellamicro.com.tw/EN/products, "Products Info" for CM3623 proximity sensor, Capella Microsystems, Inc. (2011).
www.hellotrade.com/capella-microsystems-taiwan/proximity -sensor.html, "Capella Microsystems Inc" (printed on Dec. 19, 2012).

\* cited by examiner

OPTO-ELECTRONIC MODULE AND DEVICES COMPRISING THE SAME

CROSS-REFERENCE TO RELATED APPLICATIONS

This application is a continuation of U.S. application Ser. No. 13/720,645, filed Dec. 19, 2012, which claims the benefit of priority of U.S. Provisional Patent Application No. 61/577,965, filed on Dec. 20, 2011, and U.S. Provisional Patent Application No. 61/699,687, filed on Sep. 11, 2012. The contents of the earlier applications are incorporated herein by reference in their entirety.

TECHNICAL FIELD

The invention relates to the field of opto-electronics and more specifically to miniaturized opto-electronic components. More particularly, it relates to opto-electronic modules and to appliances and electronic devices comprising such modules, in particular wherein the modules comprise a light detector and a light emitter, more particularly wherein the modules comprise or are a proximity detector. The invention relates to apparatuses according to the opening clauses of the claims.

DEFINITION OF TERMS

"Active optical component": A light sensing or a light emitting component. E.g., a photodiode, an image sensor, an LED, an OLED, a laser chip. An active optical component can be present as a bare die or in a package, i.e. as a packaged component.

"Passive optical component": An optical component redirecting light by refraction and/or diffraction and/or (internal and/or external) reflection such as a lens, a prism, a mirror, or an optical system, wherein an optical system is a collection of such optical components possibly also comprising mechanical elements such as aperture stops, image screens, holders.

"Opto-electronic module": A component in which at least one active and at least one passive optical component is comprised.

"Wafer": A substantially disk- or plate-like shaped item, its extension in one direction (z-direction or vertical direction) is small with respect to its extension in the other two directions (x- and y-directions or lateral directions). Usually, on a (non-blank) wafer, a plurality of like structures or items are arranged or provided therein, typically on a rectangular grid. A wafer may have opening or holes, and a wafer may even be free of material in a predominant portion of its lateral area. A wafer may have any lateral shape, wherein round shapes and rectangular shapes are very common. Although in many contexts, a wafer is understood to be prevailingly made of a semiconductor material, in the present patent application, this is explicitly not a limitation. Accordingly, a wafer may prevailingly be made of, e.g., a semiconductor material, a polymer material, a composite material comprising metals and polymers or polymers and glass materials. In particular, hardenable materials such as thermally or UV-curable polymers are interesting wafer materials in conjunction with the presented invention.

"Lateral": cf. "Wafer"

"Vertical": cf. "Wafer"

"Light": Most generally electromagnetic radiation; more particularly electromagnetic radiation of the infrared, visible or ultraviolet portion of the electromagnetic spectrum. In the present patent application, electromagnetic radiation of the infrared portion of the electromagnetic spectrum is of particular interest.

BACKGROUND OF THE INVENTION

In today's hand-held electronic devices such as modern smart phones, proximity sensors are widely used, e.g., for switching off a background illumination of an LCD screen of the device or for deactivating a capacitive element otherwise allowing the operation of a touch screen of the device. Such proximity sensors are typically located near an earpiece of the device and can recognize the appearance of a cheek or an ear of a user near the screen by detecting infrared (IR) light reflected from nearby objects. Upon detection of such reflected IR light, desired action can be initiated. The IR light is usually emitted by an LED which may be comprised in the proximity sensor.

Commercially available proximity sensors which have to be combined with a separate light emitter are, e.g., the Infrared Sensor Si1141 of Silicon Laboratories Inc, Texas, USA, the Light-to-Digital Converter with Proximity Sensing TSL2771 of Texas Advanced Optoelectronic Solutions Inc., Texas, USA, and the I$^2$C Proximity Sensor with Ambient Light Sensor and Interrupt CM3623 of Capella Microsystems Inc., California, USA.

A commercially available proximity sensor comprising an IR LED and two photodiodes is, e.g., the SFH 7773 of OSRAM Opto Semiconductors.

From US 2009/159900 A1, a proximity sensor is known which comprises an IR transmission die and an IR receiver die as well as two lenses each arranged above one of the dies.

From US 2010/0327164 A1, a proximity sensor is known, during the manufacture of which light emitter dice and light detector dice are overmolded using transfer molding techniques so as to form lenses on these dice.

It can be problematic to achieve a safe proximity detection, in particular when an energy-saving operation has to be ensured. An furthermore, some proximity sensors are too large for certain applications.

SUMMARY OF THE INVENTION

One object of the invention is to provide a particularly small opto-electronic module, in particular a corresponding proximity sensor. In addition, an electronic circuit comprising at least one such opto-electronic module, an electro-optic arrangement comprising at least one such an opto-electronic module and a device comprising at least one such opto-electronic module shall be provided.

Another object of the invention is to provide a particularly energy-saving opto-electronic module, in particular a corresponding proximity sensor.

Another object of the invention is to provide an opto-electronic module having a particularly safe operation, in particular a corresponding proximity sensor.

Another object of the invention is to create a way of particularly safely detecting proximity.

Another object of the invention is to provide a way of efficiently mass producing opto-electronic modules.

Another object of the invention is to provide a possibility to reduce testing work to be done when an opto-electronic module is mounted in an electro-optical arrangement and/or in a device.

Another object of the invention is to provide opto-electronic modules of particularly high sensitivity.

Further objects emerge from the description and embodiments below.

At least one of these objects is at least partially achieved by apparatuses and methods according to the patent claims.

An important point in the field of opto-electronic modules, in particular in case of proximity sensors, is to avoid cross-talk. Cross-talk can impede a safe operation of a module. Cross-talk can occur when emitted light is detected which travelled on an undesired path. E.g., if the opto-electronic module is located under a reflective or partially reflective, more particularly under a transparent but not reflection-free object such as a transparent plate, e.g., a cover glass of a device comprising the opto-electronic module, reflection may take place at that object in such a way that the reflected light is detected although this path comprising said reflection is an undesired path, because only light having passed said object should be detected.

It has turned out that particular ways of beam shaping in the opto-electronic module can remedy or mitigate or at least contribute to remedying or mitigating the cross-talk problem.

The term beam shaping as used here comprises not only beam shaping in the more usual sense of shaping emitted light—which may be referred to as emission beam shaping, but also in the sense of detection beam shaping. The latter refers to the shaping of a beam to be detected, or, one can also say to the shaping of a detection sensitivity. Completely analoguously to the possibility to assign, e.g., a "directional radiation characteristic" to a light emitting arrangement, describing an angular distribution of the intensity of light emitted by the light emitting arrangement, one can assign to a light detecting arrangement a "directional sensitivity characteristic" describing an angular distribution of the sensitivity for light incident on the light detecting arrangement from different directions and detected by the light detecting arrangement. Analogously to an emission direction (for an emission of light from a light emitting arrangement), one can define a detection direction (for a detection of light by a light detecting arrangement), the latter referring to the direction from which the detected light has impinged on the light detecting arrangement. Thinking in terms of reversed light paths or time reversal can help to understand the concept.

Note that beam shaping usually comprises redirecting light of a light beam, which is what passive optical components do. Usually, the redirected light then still comprised in the light beam. At least when viewing the invention from a particular point of view, a mere removal of light from a light beam does not constitute beam shaping (and is not what a passive optical component does), i.e. beam shaping does not comprise the case of pure vignetting, i.e. the case that merely light is removed from a light beam, e.g., using an aperture. A passive optical component has—at least in addition—other effects, consider, e.g., a lens, a prism or other passive optical components.

In a first aspect of the invention, the invention is viewed from a perspective of the properties of the emitted light and/or of the light detection properties.

In a second aspect of the invention, the invention is viewed from a perspective of the properties of the components of the opto-electronic module, which may refer to properties of one or more components and/or to their mutual arrangement.

In a generalized view of the invention, these two aspects are summarized, which is meaningful since they are closely interrelated. The components can be chosen and/or arranged so as to achieve desired properties of the emitted light and/or of the light detection and, vice versa, the desired properties of the emitted light and/or of the light detection can be achieved by choosing and/or arranging the components of the opto-electronic module accordingly.

In the generalized view, the opto-electronic module comprises
- a detecting channel comprising a detecting member for detecting light; and
- an emission channel comprising an emission member for emitting light generally detectable by said detecting member;

wherein one or more cases of the first and/or of the second aspect of the invention apply.

In the first aspect of the invention, different cases may be distinguished. One or more of these may be provided simultaneously.

In a first case of the first aspect, referred to as case A), feature A) applies:
A) a radiation distribution characteristic for an emission of light from said emission channel is non rotationally symmetric.

A "radiation distribution characteristic" characterizes a intensity distribution of emitted light, more particularly a function describing the spatial dependency of the intensity of emitted light.

In a particular view, the emitted light is characterized with respect to its angular intensity distribution. In that case, referred to as case A'), feature A) can be replaced by feature A'):
A') a directional radiation characteristic for an emission of light from said emission channel is non rotationally symmetric.

A "directional radiation characteristic" characterizes an angular light intensity distribution, more particularly a function describing the angular dependency of the intensity of emitted light.

Choosing an appropriate radiation distribution characteristic (or, more specifically, directional radiation characteristic), an improved or in particular a safer operation of the opto-electronic module can be achievable. More particularly, a cross-talk from the emission channel to the detecting channel can be minimized or suppressed. Exactly how the non rotationally symmetric characteristic has to be designed or chosen typically depends on the specific surroundings in which the opto-electronic module is installed. Furthermore, the provision of feature A) or A') can make possible a particularly small design of the opto-electronic module, while keeping the same or achieving an even better performance. The smaller design can in particular be achieved due to a possibility to arrange emission channel and detecting channel closer to each other, while maintaining a safe operation of the opto-electronic module.

In a second case of the first aspect, referred to as case B), feature B) applies:
B) a sensitivity distribution characteristic for a detection in said detecting channel of light incident on said detection channel is non rotationally symmetric;

Due to the before-described logical symmetry between light emission and light detection, the detection channel can be treated analoguously to the emission channel, cf. the above-sketched emission-detection-analogy concept. Accordingly:

A "sensitivity distribution characteristic" characterizes a distribution of the sensivity for the detection of light, more particularly a function describing the spatial dependency of the sensitivity for the detection of light.

In a particular view, the sensitivity is characterized with respect to its angular distribution (i.e. to the angular distribution of the detected light). In that case, referred to as case B'), feature B) can be replaced by feature B'):

B') a directional sensitivity characteristic for a detection in said detecting channel of light incident on said detection channel is non rotationally symmetric.

A "directional sensivity characteristic" characterizes an angular light sensivity distribution, more particularly a function describing the angular dependency of the sensitivity for the detection of light.

Because of the analogy between emission channel and detecting channel, it is, in order to avoid repetitions, referred to cases A), A') above for effects achievable by features B), B').

In a third case of the first aspect, referred to as case C), feature C) applies:

C) a central emission direction for an emission of light from said emission channel and a central detection direction for a detection of light incident on said detection channel are aligned not parallel to each other.

Unless explicitly stated otherwise, the term "parallel" includes what sometimes is referred to as "antiparallel".

Under a "central emission direction" we understand the mean direction resulting from a weighted averaging of a directional emission characteristic.

Under a "central detection direction" we understand the mean direction resulting from a weighted averaging of a directional sensitivity characteristic.

Providing that these directions are not parallel to each other, an improved or, in particular, a particularly safe operation of the opto-electronic module can be achievable. More particularly, a cross-talk from the emission channel to the detecting channel can be minimized or suppressed. Exactly how these directions should be aligned with respect to each other typically depends on the specific surroundings in which the opto-electronic module is installed. Furthermore, the provision of feature C) can make possible a smaller design of the opto-electronic module, while keeping the same or even a better performance. The smaller design can in particular be achieved due to a possibility to arrange emission channel and detecting channel closer to each other, while maintaining a safe operation of the opto-electronic module.

It can, in typical situations, be advantageous to provide that the central emission direction and the central detection direction, when viewed as arrows starting at an output of the emission channel (where the light is emitted from the opto-electronic module) and starting at the input of the detecting channel (where light enters the opto-electronic module in order to be detected in the detecting channel), respectively, are diverging, i.e. their mutual distance increases with increasing distance from the opto-electronic module. Small, safely operating opto-electronic modules can be achievable this way. In particular, it can be provided that said arrows lie substantially in a common plane and diverge.

In a fourth case of the first aspect, referred to as case D), feature D) applies:

D) a main emission direction for an emission of light from said emission channel and a main detection direction for a detection of light incident on said detection channel are aligned not parallel to each other.

(As stated above, the term "parallel" includes what sometimes is referred to as "antiparallel".)

Under a "main emission direction" we understand that direction in which the maximum light intensity is emitted.

Under a "main detection direction" we understand that direction (of incident light) for which the detection sensivity is maximum.

Providing that these "main directions" are not parallel to each other can result in generally the same effects as described above for the "central directions". In order to avoid repetitions, it is therefore referred to case C) above for effects achievable by feature D).

In the second aspect of the invention, different cases may be distinguished. One or more of these may be simultaneously provided. One could try to at least approximately characterize the second aspect by providing in at least one of the emission channel and the detecting channel an optical arrangement having a broken symmetry or, more particularly a "de-centered optical arrangement" or a "de-centering optical arrangement" or an optical arrangement with "partially shifted optical components" or an optical arrangement with at least one "off-center optical component". More concrete and precise ways of expressing the second aspect are defined the following cases e1) to e4).

In all of these cases, one or more passive optical components are addressed. These are in most cases diffractive or refractive components, but may also be reflective components. Typically, one or more lens elements (diffractive or rather refractive) will be provided embodying these passive optical components, but other passive optical components, e.g., one or more prisms, can also be provided. Note that a mechanical element which solely excludes a portion of light, such as an aperture does, do itself not constitute a passive optical component.

Usually, said one or more passive optical components referred to in the second aspect are arranged distanced to said detecting member and to said emission member, respectively.

In a first case of the second aspect, at least a first one of said detecting channel and said emission channel comprises e1) at least two passive optical components each having an optical axis, wherein said at least two passive optical components are arranged such that said at least two optical axes do not coincide.

Here, the two passive optical components are "shifted" or "off-center" with respect to each other. The particular arrangement of case e1) allows to create and, at the same time, eliminate specific optical paths for the emitted and the detected light, respectively. This way, an improved and, in particular, a safer operation of the opto-electronic module can be achievable. More particularly, cross-talk from the emission channel to the detecting channel can be minimized or suppressed. Exactly how said optical axes are optimally aligned typically depends on the specific surroundings in which the opto-electronic module is installed. Typically, said optical axes are distanced and aligned parallel to each other.

Furthermore, the provision of case e1) can make possible a smaller design of the opto-electronic module, while keeping the same or even a better performance. The smaller design can in particular be achieved due to a possibility to arrange emission channel and detecting channel closer to each other, while maintaining a safe operation of the opto-electronic module.

In a second case of the second aspect, at least a first one of said detecting channel and said emission channel comprises e2) at least one passive optical component having an optical axis, wherein said at least one passive optical component is arranged with respect to said detecting member and said emission member, respectively, comprised in said first channel such that said optical axis does not coincide with a central axis of detection and emission, respectively, of said detecting member and said emission member, respectively, comprised in said first channel.

Here, in case e2), light detection (in the detection member) and light emission (in the emission member), respectively, is "off-center" with respect to the passive optical component. The achievable effects are generally the same as in case e1) above. Therefore, for the achievable effects of case e2), it is referred to the above-described effects of case e1).

Under a "central axis of emission", we understand that line along which, in terms of a weighted average, the emitted light intensity is maximum. E.g., if an emission member has a rectangular homogeneously emitting optically active surface, the central axis of emission thereof is the line perpendicular to the rectangle and passing through the middle of the rectangle.

Under a "central axis of detection", analogously and considering the above-sketched emission-detection-analogy concept, we understand that line for which, in terms of a weighted average, the light sensitivity is maximum. E.g., if a detection member has a rectangular homogeneously sensitive optically active surface, the central axis of detection thereof is the line perpendicular to the rectangle and passing through the middle of the rectangle.

In a third case of the second aspect, at least a first one of said detecting channel and said emission channel comprises
- e3) at least one passive optical component constituting a non rotationally symmetric beam forming element or a portion of a non rotationally symmetric forming element, in particular a non rotationally symmetric lens or a portion of a non rotationally symmetric lens.

Here, the respective (first) channel comprises a "de-centered optical arrangement" because of the non rotationally symmetric beam forming element which may, e.g., be a lens or lens element, e.g., an aspheric lens or lens element. The achievable effects are generally the same as in case e1) above. Therefore, for the achievable effects of case e3), it is referred to the above-described effects of case e1).

In a fourth case of the second aspect, at least a first one of said detecting channel and said emission channel comprises
- e4) at least one passive optical component arranged so as to accomplish that a main direction or a central direction of light entering and exiting, respectively, said first channel is angled with respect to a main direction and central direction, respectively, of light entering and exiting, respectively, said first channel without presence of said at least one passive optical component in said first channel.

Here, the passive optical component, e.g., a prism, accomplishes a break in symmetry of the optical arrangement in the respective (first) channel. In particular, the way said main or central direction is angled can be selected so as to create diverging central emission directions and central detection directions like described in case C) above and/or diverging main emission directions and main detection directions like described in case D) above. The achievable effects are generally the same as in case e1) above. Therefore, for the achievable effects of case e3), it is referred to the above-described effects of case e1).

The provision of at least one lens element in one or both channels can, in the first as well as in the second aspect of the invention, contribute to a safe operation of the opto-electronic module and/or to a low energy consumption of the opto-electronic module, because this makes possible to make very efficient use of the light emitted from the emission channel and of the light entering the detection channel, respectively. And if one or more of the passive optical components mentioned in one of the cases e1) to e3) or possibly also e4) contributing to the "de-centering" or symmetry breaking of the optical arrangement in the respective channel is embodied as a lens or lens element, this may contribute to the possibility of designing a particularly small opto-electronic module.

Various more specific embodiments will be described below. Unless otherwise stated or logically impossible, these can be applied to any one or more of the cases A) to D) and e1) to e4) described above, irrespective of the case or cases being assigned to the first and/or the second aspect of the invention.

In one embodiment, said light generally detectable is light in the infrared portion of the spectrum.

In one embodiment which may be combined with the before-addressed embodiment, said emission member comprises or, in particular is, a light emitting diode (LED). Alternatively or additionally, it could comprise a laser. The emission member can be a packaged component or, alternatively, an unpackaged component, wherein the provision of the latter can allow to achieve a particularly small design of the opto-electronic module. Packaged light sources like packaged LEDs often comprise a "blob", i.e. an approximately drop-shaped portion of transparent material (transparent at least to the emitted light) covering at least the active optical surface of the light source. Such a "blob" may be present on the emission member or not. In a packaged emission member, a reflector such as a reflective baffle may be comprised or not.

In one embodiment which may be combined with one or more of the before-addressed embodiments, at least one of
- a projection of a central emission direction or of a main emission direction of said emission channel onto a line comprising the output of the emission channel and the input of the detecting channel results in a vector pointing away from the input of the detecting channel;
- a projection of a central detection direction or of a main detection direction of said detecting channel onto a line comprising the output of the emission channel and the input of the detecting channel results in a vector pointing away from the output of the emission channel.

In particular, both are fulfilled.

Providing that such an alignment of central and/or main directions can make possible to achieve an improved and, in particular, a particularly safe operation of the opto-electronic module. More particularly, a cross-talk from the emission channel to the detecting channel can be minimized or suppressed. Exactly how these directions should be aligned with respect to each other typically depends on the specific surroundings in which the opto-electronic module is installed. Furthermore, the described alignment of directions can make possible a smaller design of the opto-electronic module, while keeping the same or even a better performance. The smaller design can in particular be achieved due to a possibility to arrange emission channel and detecting channel closer to each other, while maintaining a safe operation of the opto-electronic module.

In one embodiment which may be combined with one or more of the before-addressed embodiments, said opto-electronic module is a proximity sensor. In a proximity sensor, the described aspects of the invention and the described cases can be particularly beneficial.

In one embodiment which may be combined with one or more of the before-addressed embodiments, said opto-electronic module comprises
- a housing in which said detecting member and said emission member are arranged.

This way, distances and mutual alignments of constituents of the opto-electronic module can be well-defined and very precise, such that light paths inside the opto-electronic module and partially also light paths outside the opto-electronic module can also be particularly well defined and precise. This can considerably simplify the handling of the opto-electronic module and facilitate mounting and assembling the opto-electronic module to or in another device and can lead to considerably reduced testing requirements after the opto-electronic module has been implemented.

In one embodiment referring to the last-addressed embodiment, it is provided that the emission and the detection channels are provided in separate compartments provided in said housing. This can reduce cross-talk between the channels and make a particularly small design of the opto-electronic module possible.

In one embodiment referring to one or both of the two last-addressed embodiments, a shape of said housing defines a first plane, and at least one of
- a radiation intensity distribution for an emission of light from said emission channel; and
- a radiation sensitivity distribution for the detection by said detecting member of light incident on said opto-electronic module;

is asymmetric with respect to any surface normal of said first plane, and in particular both applies. This first plane typically is a plane in which an output of the emission channel and an an input of the detecting channel is comprised.

A radiation intensity distribution is related to a radiation distribution characteristic in that the latter is a mathematical or functional description of the phenomenon designated by the former.

A radiation sensitivity distribution is related to a sensivity distribution characteristic in that the latter is a mathematical or functional description of the phenomenon designated by the former.

This may contribute to the possibility of providing a particularly small design of the opto-electronic module and/or to a particularly safely operating opto-electronic module.

In one embodiment referring to the last-addressed embodiment, that portion of said radiation intensity distribution and radiation sensitivity distribution, respectively, referring to outgoing and incoming light, respectively, in a second plane, is asymmetric with respect to any surface normal of said first plane, wherein said second plane is perpendicular to said first plane and contains a line interconnecting an output of said emission channel and an input of said detecting channel.

This may contribute to the possibility of providing a particularly small design of the opto-electronic module and/or to a particularly safely operating opto-electronic module.

In one embodiment which may be combined with one or more of the before-addressed embodiments, constituents of said opto-electronic module are structured and arranged such that at least one of cases A), B), C), D) applies, in particular wherein said constituents comprise at least one passive optical component. This is an elegant way of accomplishing one or more of cases A), B), C), D).

In one embodiment which may be combined with one or more of the before-addressed embodiments, at least one of cases e1) to e4) applies such that at least one of cases A) to E) applies.

In one embodiment which may be combined with one or more of the before-addressed embodiments, said cases A) and B) applies. This may contribute to the possibility of providing a particularly small design of the opto-electronic module and/or to a particularly safely operating opto-electronic modules.

In one embodiment which may be combined with one or more of the before-addressed embodiments, in each of said emission channel and detecting channel, at least one of cases e1) to e4) applies. This may contribute to the possibility of providing a particularly small design of the opto-electronic module and/or to a particularly safely operating opto-electronic modules.

In one embodiment which may be combined with one or more of the before-addressed embodiments, one of said detecting channel and said emission channel comprises, in particular both of said detecting channel and said emission channel comprise, at least one passive optical component, said at least one passive optical component being identical with or different from passive optical components addressed in one or more of cases e1) to e4), in particular wherein said at least one passive optical component is a lens element.

In one embodiment which may be combined with one or more of the before-addressed embodiments, at least one of said detecting and emission channels comprises at least one lens element which is cut at at least one side. In fact, this "cut lens" aspect can constitute another aspect (third aspect) of the invention which may be, but not necessarily has to be, combined with the first and/or second aspect of the invention. This can make possible to realize a particularly small design of the opto-electronic module, while keeping the same or achieving an even better performance. The smaller design can in particular be achieved due to a possibility to arrange emission channel and detecting channel closer to each other, while maintaining a safe operation of the opto-electronic module.

In one embodiment referring to the before-addressed embodiment, said side is a side facing the respective other channel. This can allow to have the emission channel and the detection channel particularly close to each other.

In one embodiment referring to one or both of the two last-addressed embodiments, said cut lies in a plane parallel to an optical axis of said lens element.

In one embodiment which may be combined with one or more of the before-addressed embodiments, the opto-electronic module comprises a substrate on which said detecting member and said emission member are mounted, in particular wherein said substrate is a printed circuit board. This can facilitate efficient (in particular wafer-level) manufacturing of the opto-electronic modules. The substrate (or printed circuit board) can provide one or more (typically at least two, rather at least four) electrical contacts of the opto-electronic module to the outside.

In one embodiment which may be combined with one or more of the before-addressed embodiments, the opto-electronic module comprises an optics member comprising at least one passive optical component, in particular wherein in case of case e2) or case e3) or case e4), that at least one passive optical component is the at least one passive optical component addressed in the respective case, and wherein in case of case e1), said optics member comprises the at least two passive optical components addressed in case e1).

The provision of an optics member can facilitate efficient (in particular wafer-level) manufacturing of the opto-electronic modules.

In one embodiment referring to the before-addressed embodiment, said optics member comprises all passive optical components comprised in the opto-electronic module. This can greatly simplify the manufacturing of the opto-electronic modules and can make possible to achieve an excellent alignment precision.

In one embodiment referring to one or both of the two last-addressed embodiments, the opto-electronic module further comprises a spacer member. This spacer member can, in case the before-addressed substrate is provided, be arranged between said substrate and said optics member.

The provision of a spacer member can facilitate efficient (in particular wafer-level) manufacturing of the opto-electronic modules.

Such a spacer member can be provided for providing a well-defined distance between said optics member and said substrate. This way, in one or both channels, a well-defined vertical distance between the at least one passive optical component in the respective channel and the detecting member and emission member, respectively, can be ensured.

In one embodiment referring to one or more of the three last-addressed embodiments, the opto-electronic module further comprises a baffle member arranged next to said optics member and forming a portion of a housing of said opto-electronic module. Such a baffle member (in particular a vertical face thereof) can describe the first plane described further above. Such a baffle member an be used for attaching the opto-electronic module to an object, e.g., when assembling the opto-electronic module to or in a device. The baffle member can be usable as a reference for the emission and detection optics of the opto-electronic module. In other words, mounting and assembling the opto-electronic module can be simplified and can be accomplished with particularly high precision because of the baffle member, e.g., by attaching the opto-electronic module at the baffle member to an object or device. When the object and device, respectively, has (in the attachment region) a sufficiently well-defined and precise geometry, a high-precision optical arrangement or device can readily be obtained. Reproducible high-precision optical arrangements or devices can be obtained rendering superfluous the need of individual testing.

In one embodiment which may be combined with one or more of the before-addressed embodiments, said detecting channel and said emission channel are physically separated, in particular wherein said physical separation is constructed such that light generally detectable by said detecting member emitted by said emission member and remaining within the opto-electronic module cannot enter the detecting channel and be detected by said detecting member. This can contribute to a safe operation of the opto-electronic module and to possibilities of making particularly small opto-electronic modules.

In particular, it can be provided that the opto-electronic module comprises at least one spacer, an optics member, a baffle member and a substrate (see above), and wherein all these contribute to constituting said physical separation, e.g., to provide the separate compartments mentioned further above.

In one embodiment which may be combined with one or more of the before-addressed embodiments, the opto-electronic module comprises a control unit, e.g., an integrated circuit, in particular wherein this control unit is provided for controlling said emission member and/or for outputting control signals depending on detection signals produced by said detection member. Such an opto-electronic module can be particularly powerful and easy to use.

In one embodiment which may be combined with one or more of the before-addressed embodiments, the opto-electronic module comprises another detecting member. E.g., the detecting members can be sensitive to different (overlapping or not-overlapping) spectral ranges, e.g., one of the detecting members could be provided for detecting ambient light (ambient light sensing), and the other for infrared sensing, as a proximity sensor. This can make the opto-electronic module multifunctional and/or allow to provide more significant output from the opto-electronic module.

In one embodiment which may be combined with one or more of the before-addressed embodiments, the opto-electronic module comprises another emission member. E.g., the emission members can emit light of different (overlapping or not-overlapping) spectral ranges. This can make the opto-electronic module multifunctional and/or allow to provide more significant output from the opto-electronic module.

The invention also comprises an electronic circuit comprising at least one opto-electronic module according to the invention.

In one embodiment, the electronic circuit comprises a printed circuit board on which said at least one opto-electronic module is mounted.

In one embodiment referring to the before-addressed embodiment, the electronic circuit comprises a control unit operationally connected to said at least one opto-electronic module, e.g., for controlling a display illumination operationally connected to said electronic circuit and/or for controlling an input unit such as a touch screen operationally connected to said electronic circuit and/or for activating/initiating or activating/deactivating a user input channel such as an acoustic user input involving with speech recognition. Said control unit can additionally or alternatively be used for detecting and differentiating gestures made by a user, wherein in this case, usually a multitude, e.g., an array, of proximity sensors will be used.

The invention also comprises an electro-optic arrangement comprising at least one opto-electronic module according to the invention or an electronic circuit according to the invention and, in addition, comprising an object to which said at least one opto-electronic module is attached in an attachment region of said object, wherein at least in a portion of said attachment region said object is transparent for light generally detectable by said detecting member.

In one embodiment of the electro-optic arrangement, at least in said attachment region said object is generally plate-shaped. This can facilitate the manufacture of a well-defined electro-optic arrangement with predictable operation. In particular, it can be provided that said object is generally plate-shaped.

In one embodiment of the electro-optic arrangement which may be combined with the before-addressed embodiment, said detecting channel and said emission channel and said object are structured and arranged such that light emitted from said emission channel and experiencing a single internal reflection in said object propagates on paths only which do not reach an optically active surface of said detecting member.

Therein, one or more of the cases A) to D) and/or one or more of the cases e1) to e4) can be provided in order to accomplish this. And, this can make possible to achieve a predictable, safe operation of the opto-electronic module, wherein the opto-electronic module can even be particularly small. Cross-talk can be avoided or at least be largely reduced by this.

An "optically active surface" is the light-sensitive area of a detecting member or, in case of an emission member, the light-emitting area of the emission member. In other words, the optically active surface designates that surface portion of the member at which light is emitted and at which light must arrive in order to be detectable, respectively.

In one embodiment of the electro-optic arrangement which may be combined with one or more of the before-addressed embodiments, said object has a first side and generally opposite thereto a second side, said opto-electronic module being attached to said first side. Therein, in particular, a surface of said object at said second side can be structured such that light generally detectable by said detecting member propagating inside said object can, at least partially, be internally reflected by said surface. Said internal reflection usually comprises or substantially is specular reflection.

This describes a typical situation in which the invention can find application, and in which cross-talk may impede safe operation if the invention is not implemented.

In one embodiment of the electro-optic arrangement which may be combined with one or more of the before-addressed embodiments, said object is a transparent plate, in particular a transparent glass plate or a transparent polymer plate.

The invention also comprises a device comprising at least one opto-electronic module according to the invention or an electronic circuit according to the invention or an electro-optic arrangement according to the invention. Such a device typically is an electronic and/or an electro-optic device.

In one embodiment of the device, the device is a hand-held device, in particular a hand-held communication device, more particularly a smart phone. It can also be, e.g., a hand-held music-playing device.

In such devices, opto-electronic modules and in particular proximity sensors can usually be usefully applied.

In one embodiment of the device which may be combined with the last-addressed embodiment, the device is a photographic device, in particular a photo camera or a video camera. In such devices, opto-electronic modules and in particular proximity sensors can usually be usefully applied.

In one embodiment of the device which may be combined with one or both of the the two last-addressed embodiments, the device comprises an electro-optic arrangement according to the invention, wherein said object is at least a part of a housing of said device. In particular, the object is a cover glass of said device.

The third aspect of the invention already mentioned above may, at least in a particular view, be represented in an opto-electronic module comprising
a first optical channel;
a second optical channel;
wherein at least one of said first and second optical channels comprises an optical structure, for which one or more of the following applies:
said optical structure constituting a non rotationally symmetric beam forming element or a portion of a non rotationally symmetric forming element, in particular wherein said optical structure is a passive optical component constituting a non rotationally symmetric beam forming element or a portion of a non rotationally symmetric forming element;
said optical structure constituting a non rotationally symmetric lens or a portion of a non rotationally symmetric lens, in particular wherein said optical structure is a passive optical component constituting a non rotationally symmetric lens or a portion of a non rotationally symmetric lens;
said optical structure constituting a passive optical component having a non-circular aperture, in particular a lens or lens element having a non-circular lens aperture;
said optical structure constituting a passive optical component having an aperture describing a shape of a truncated circle, in particular a lens or lens element describing a shape of a truncated circle;
said optical structure constituting a passive optical component having an aperture describing a shape of a circle a section of which is replaced by a straight line, in particular a lens or lens element describing a shape of a circle a section of which is replaced by a straight line;
said optical structure constituting a truncated lens or lens element, in particular wherein said lens or lens element is truncated along a straight line;
said optical structure is a cut optical structure, in particular a cut lens or lens element;
said optical structure is a lens or lens element which is cut at at least one side;
said optical structure constituting a lens or lens element having a non-circular edge, in particular an edge comprising a circular edge portion and, in addition, a non-circular edge portion, more specifically wherein said non-circular edge portion describes a straight line.

In one embodiment referring to the before-addressed embodiment,
a truncated side of said truncated circles faces the respective other channel;
said straight line of said aperture faces the respective other channel;
a truncated portion of said truncated lens or lens element faces the respective other channel;
a cut portion of said cut optical structure faces the respective other channel;
said at least one side at which said lens or lens element is cut faces the respective other channel; and
said non-circular edge faces the respective other channel; respectively. This can allow to have the emission channel and the channels particularly close to each other.

As will have become clear from the above, the invention may allow to provide miniaturized opto-electronic modules having an excellent performance. Typical dimensions of an opto-electronic module described amount (laterally) to at most 8 mm, in particular at most 5 mm, more particularly at most 4 mm in one lateral direction and at most 5 mm, in particular at most 4 mm, more particularly at most 3 mm in a lateral direction perpendicular thereto. Perpendicularly thereto, i.e. vertically, the opto-electronic modules typically extend at most 2.5 mm, more particularly at most 1.6 mm. The opto-electronic modules are well suitable to be mass-produced on wafer-scale. Various details and embodiments concerning a wafer-level manufacture of the opto-electronic modules and to their design and composition are not described in the present patent application, but are described in the US provisional patent application filed on Jul. 19, 2011 having the application No. 61/509,346. Therefore, said US provisional patent application with application No. 61/509,346 is herewith incorporated by reference in the present patent application. Also typical dimensions of wafers usable for manufacturing the opto-electronic modules are disclosed in said application.

Further embodiments and advantages of the present invention emerge from the dependent claims and the figures.

BRIEF DESCRIPTION OF THE DRAWINGS

Below, the invention is described in more detail by means of examples and the included drawings. The figures show.

The described embodiments are meant as examples and shall not confine the invention.

DETAILED DESCRIPTION OF THE INVENTION

Figure 1:
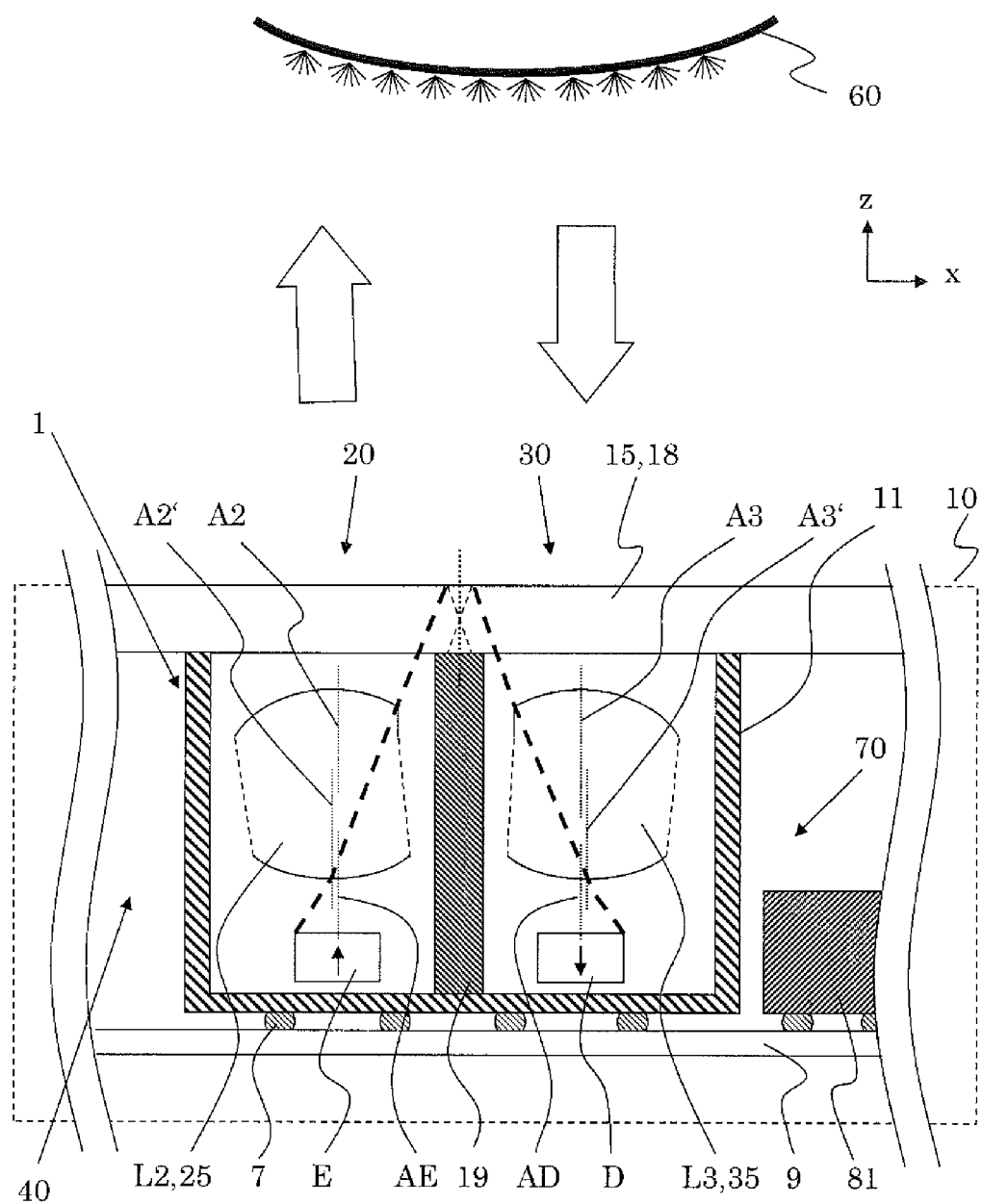
FIG. 1 a schematic cross-sectional illustration of an opto-electronic module, of an electronic circuit, of an electro-optic arrangement and of a device comprising an opto-electronic module.

FIG. 1 shows a schematic cross-sectional illustration of an opto-electronic module 1, of an electronic circuit 70 comprising said opto-electronic module 1, of an electro-optic arrangement 40 comprising said opto-electronic module 1 and an object 18 and of a device 10 comprising said opto-electronic module 1 as well as said electronic circuit 70 and said electro-optic arrangement 40.

The device 10 is an electronic device and can in particular be a hand-held device, e.g., a hand-held music-playing device, a portable computing device, a photographic device, a mobile communication device, or others.

Device 10 comprises a housing 15, and, as illustrated in FIG. 1, it is possible to provide that opto-electronic module 1 is attached directly to housing 15, more specifically to that portion of housing 15 which is formed by object 18. Object 18 is at least partially transparent and is generally plate-shaped, at least on the region in which opto-electronic module 1 is attached. Object 1 can be, e.g., a cover glass of device 10.

Electro-optic arrangement 40 comprises or even is substantially composed of said opto-electronic module 1 and said object 18. As will be explained below, the interaction between opto-electronic module 1 and object 18 can be of particular importance.

Said electronic circuit 70 comprises opto-electronic module 1 and a printed circuit board 9 on which opto-electronic module 1 and other components such as electronic component 81 are mounted.

Opto-electronic module 1 will be explained assuming that it is a proximity sensor, but opto-electronic module 1 can also be a different opto-electronic component, e.g., an ambient light sensor or others.

Opto-electronic module 1 comprises an emission channel 20 and a detecting channel 30. Emission channel 20 comprises an emission member E for emitting light, e.g., infrared light. Detecting channel 30 comprises a detecting member for detecting light, e.g., infrared light. At least a (spectral) portion of the light emittable by emission member E is generally detectable by detecting member D, i.e. is detectable by detecting member D if it reaches detecting member D. Emission member E can be a light emitter such as, e.g., an LED or a laser, and detecting member D can be a detector such as, e.g., a photo diode.

For functioning as a proximity sensor, the nearness of a surface 60 such as a part of a human body, e.g., a cheek, hair, an ear, to opto-electronic module 1 is detectable by detecting light emitted from emission channel 20 (cf. the upward-pointing open arrow in FIG. 1) and reflected from surface 60 (usually having an approximately Lambertian reflectance) which then enters detecting channel 30 (cf. the downward-pointing open arrow in FIG. 1) and is detected by detecting member D. Typically, emission member E emits light pulses. A detection of light in detecting channel 30 which originated from emission channel 20 but did not leave opto-electronic module 1 usually shall be avoided in order to achieve a high sensitivity and a proper and safe operation of opto-electronic module 1.

In order to avoid an entry in detecting channel 30 and a detection by detecting member D of light which did not exit electro-optic arrangement 40, the provision of an optical arrangement having a broken symmetry or of a "de-centered optical arrangement" or of a "de-centering optical arrangement" or of an optical arrangement with "partially shifted optical components" or similar can be provided, cf. also the "second aspect" of the invention in section "Summary of the Invention" above. In a different view, this can be accomplished by making sure that characteristics of the emitted and/or detected light in emission channel 20 and detecting channel 30, respectively, are suitably chosen, cf. also the "first aspect" of the invention in section "Summary of the Invention" above.

Opto-electronic module 1 comprises a housing 11 in which said channels 20 and 30 are formed, e.g., by forming two separate compartments. Housing 11 can be designed to impede the entrance of light into opto-electronic module 1 which impinges on the sides or on the bottom of opto-electronic module 1. And, e.g., on the bottom (as shown in FIG. 1), electrical contacts of opto-electronic module 1 can be provided for making electrical contact with printed circuit board 9, e.g., with attached solder balls 7.

An isolating member 19, usually of non-transparent material or of suitably coated material, is provided which impedes direct propagation of light from emission channel 20 to detecting channel 30, wherein isolating member 19 can be composed of various constituents as will be clear from explanations below (cf. also FIGS. 6, 7, 10, 11).

Emission channel 20 comprises emission optics 25 which are suitably chosen and/or suitably arranged with respect to emission member E, wherein emission optics 25 may comprise or even, as shown in FIG. 1, be a passive optical component L2 such as a lens member, e.g., a composed lens. Instead of having a usual setup with all optical axes A2, A2' of lens elements of passive optical component L2 and the central axis of emission AE of emission member E coinciding, one or more of the axes do not coincide, as illustrated in FIG. 1.

Detecting channel 30 is, in the example of FIG. 1, designed correspondingly, comprising detecting optics 35 which are suitably chosen and/or suitably arranged with respect to detecting member D, wherein detection optics 35 may comprise or even, as shown in FIG. 1, be a passive optical component L3 such as a lens member, e.g., a composed lens. Instead of having a usual setup with all optical axes A3, A3' of lens elements of passive optical component L3 and the central axis of detection AD of detecting member D coinciding, one or more of the axes do not coincide, as illustrated in FIG. 1. As illustrated in FIG. 1, the optical setups in the channels 20 and 30 can be mutually mirror-symmetric.

It can, in principle, be sufficient to provide such non-coincidence in axes in only one of the channels 20 and 30, but usually, a safe operation can be better guaranteed if it is provided in both channels 20 and 30. Of course, a mirror-symmetric setup as illustrated in FIG. 1 can, but does not have to be provided.

As illustrated in FIG. 1, the light emitted by emission member E which is most likely to enter detection channel 30 without exiting electro-optic arrangement 40, cf. the thick dashed line starting at emission member E, is internally reflected at the upper surface of object 18 and then ends up on isolating member 19. If a usual, fully centered and rotationally symmetric setup (of emission optics 25 and emissing member E) would have been chosen, the light would have been able to enter detection channel 30 after the reflection at said upper surface and thus would have been detected, thus constituting an undesired cross-talk between the channels 20 and 30. Similarly, referring to the detection side, cf. the thick dashed line ending at detecting member D, light that would barely be detectable by detecting member D while having been subjected to a reflection at said upper surface of object 18 while originating from as close as possible to emission channel 20 would have to originate from a location on isolating member 19, where in fact no light originates. It is assumed that a three-fold reflection of light (such as a three-fold internal reflection inside object 18) results in a loss of intensity making the remaining light too weak to pose a problem for opto-electronic module 1.

Ways of realizing optics 25, 35 and passive optical components L2,L3 like providable in the embodiment of FIG. 1 will be described below in conjunction with FIGS. 6 to 11.

Accordingly, due to the specific design of one or both channels 20 and 30, a cross-talk between them via internal reflection in object 18 can be successfully avoided. Therein, it is noteworthy that the lateral dimensions (x; y) of opto-electronic module 1 are relatively small (note that locating the channels 20 and 30 far-apart can also reduce cross-talk but increases the—lateral—dimensions of opto-electronic module 1), and that a high sensitivity can be reached because of an efficient use of light (light emitted from emission channel E and light impinging on detecting channel 30 for being detected) due to the provision of lenses or lens elements.

In the embodiment illustrated in FIG. 1, a particular feature combination is realized which may provide a particularly useful combination of advantages. This feature combination comprises emission and detection channels have an at least substantially mirror-symmetric design, more particularly so
with respect to the arrangement of corresponding active optical components (detection member and emission member; more particularly referring to the alignment of the optically active surface of the respective active optical components) and
with respect to the arrangement and design of the passive optical components (e.g., lens elements;) and
possibly also with respect to the arrangement of the housing or housing components; and
in each channel:
two optical structures, more particularly two convex lens elements, are provided, their optical axes being at least substantially vertically aligned; wherein
that respective optical structure which is farther away from the respective active optical component (detection member; emission member) comprised in the respective channel is at least substantially on-axis with the respective active optical component (detection member; emission member) in the channel, more precisely, the respective optical axis of said optical structure at least substantially coincides with an axis central and perpendicular to the respective optically active surface; and
the cut face at said optical structure substantially faces towards the respective other channel;
the other respective optical structure (which is closer to the respective active optical component) (detection member; emission member) comprised in the respective channel is off-axis with the before-addressed coinciding axes, more particularly, an optical axis of this optical structure is, with respect to the before-addressed coinciding axes, shifted away from the other channel.

Figure 2:
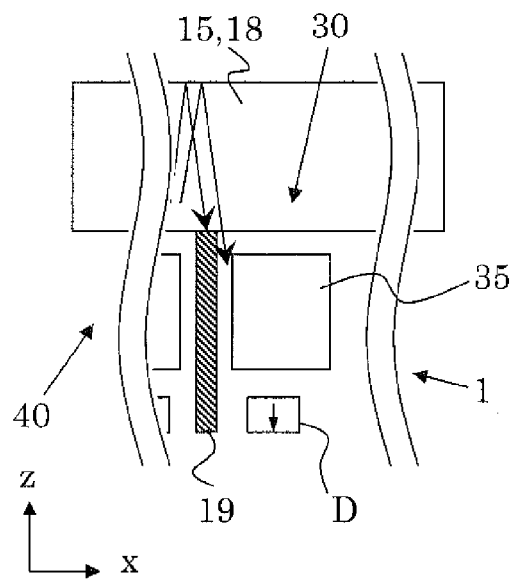
FIG. 2 a schematic cross-sectional illustration of an opto-electronic module, of an electro-optic arrangement and of light.
Figure 3:
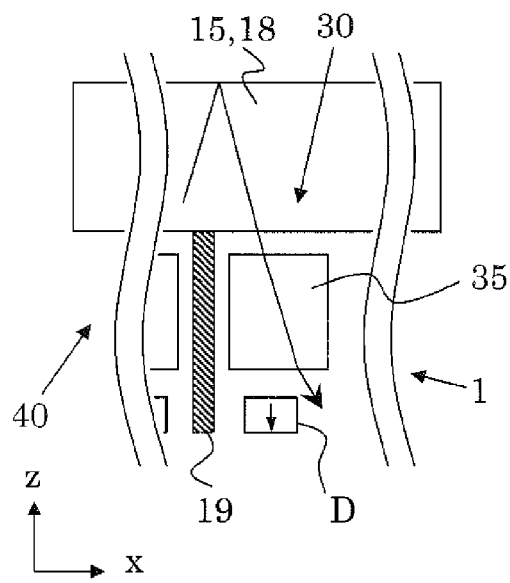
FIG. 3 a schematic cross-sectional illustration of an opto-electronic module, of an electro-optic arrangement and of light.

FIGS. 2 and 3 are schematic cross-sectional illustrations of an opto-electronic module 1, of an electro-optic arrangement 40 and of light in electro-optical arrangement 40. More precisely, it is illustrated therein how light impinging on opto-electronic module 1 after reflection at the upper surface of object 18 can travel and not be detected by detecting member D.

In FIG. 2, the left reflected arrow indicates light like already discussed in conjunction with FIG. 1. The right reflected arrow indicates the possibility that light may, after having been internally reflected in object 18, enter detection channel 30, but not enter detection optics 35 and thus will not reach detecting member D.

In FIG. 3 is illustrated the case of light entering detection channel D and detection optics 35 after having been internally reflected in object 18, but nevertheless not reaching detecting member D.

Figure 4:
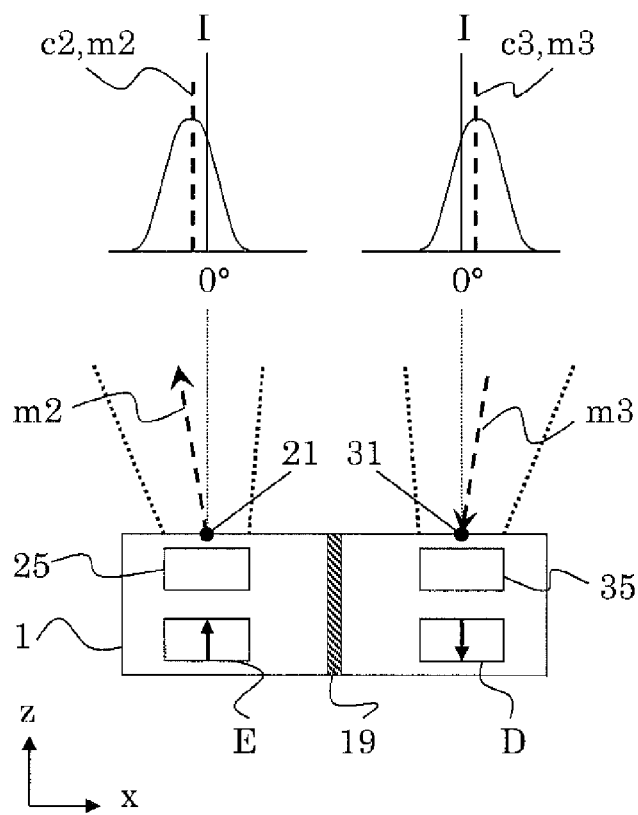
FIG. 4 a schematic cross-sectional illustration of an opto-electronic module and of distribution characteristics.
Figure 5:
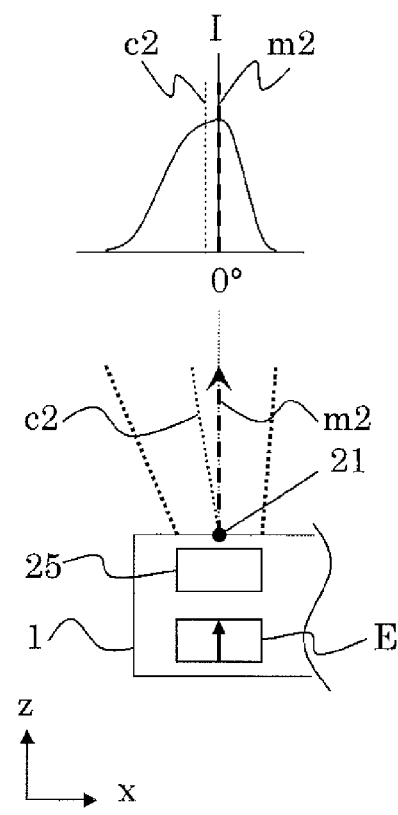
FIG. 5 a schematic cross-sectional illustration of an opto-electronic module and of distribution characteristics.

FIGS. 4 and 5 are schematic cross-sectional illustrations of an opto-electronic module 1 and of distribution characteristics. In FIG. 4, in both channels 20 and 30, distribution characteristics are not rotationally symmetric with respect to the vertical direction (z); in FIG. 5, a non-rotationally symmetric radiation distribution characteristic of emission channel 20 is shown; the detection channel (not shown in FIG. 5) can have a similar or a different optical setup. In FIGS. 4 and 5, above the respective channel 20 and 30, respectively, directional radiation characteristics and directional sensivity characteristics are schematically illustrated, respectively. In case of FIG. 4, these characteristics are rotationally symmetric, but not with respect to a vertical axis (z). Therefore, main emission axis m2 and central emission axis c2 coincide, as do axes m3 and c3. As can be seen in the upper as well as in the lower portion of FIG. 4, the axes c2, m2 of emission channel 20 diverge from the axes c3, m3 of detecting channel 30; the approximate outer bounds of the emitted light and of the detection sensivity, respectively, as illustrated by the thick dotted lines, are tilted outward (away from the respective other channel) with respect to the case of being symmetric around a vertical axis. This can contribute to a cross-talk supression.

In FIG. 5, the radiation distribution characteristic is not rotationally symmetric, even though the main emission direction m2 coincides with the vertical (z). Also this can contribute to a cross-talk supression. Main emission direction m2 can also be chosen not to coincide with the z-axis.

In FIGS. 4 and 5, the approximate positions of the output 21 of emission channel 20 and of the input 31 of detecting channel 30 are indicated.

Figure 6:
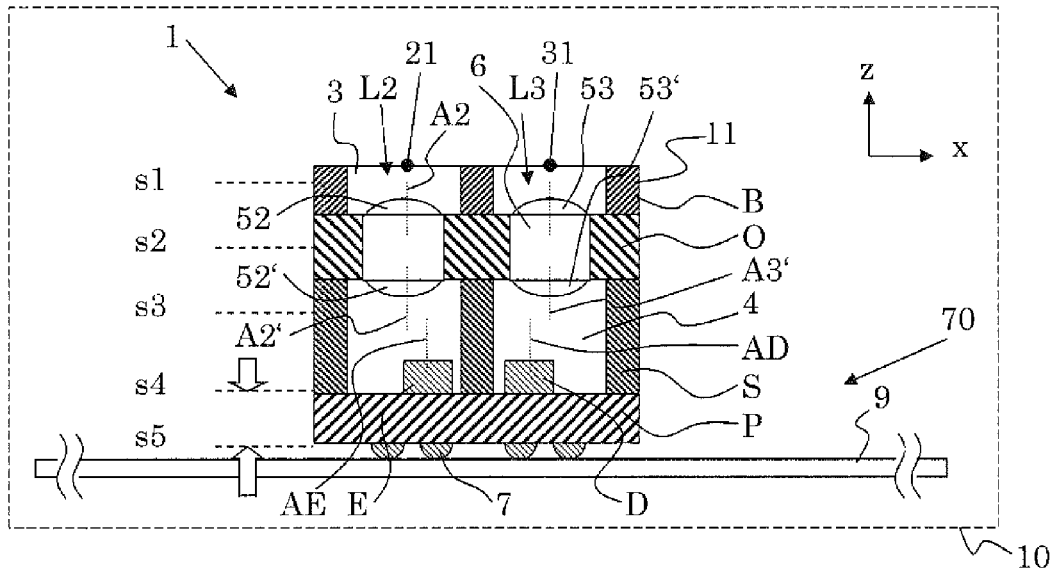
FIG. 6 a schematic cross-sectional view of an opto-electronic module and of an electronic circuit and of a device.

FIG. 6 shows a schematic cross-sectional view of an opto-electronic module 1 and of an electronic circuit 70 and of a device 10. Generally, with respect to FIGS. 6 to 9 and their description, it is referred to the above-mentioned incorporated U.S. provisional application 61/509,346 of Jul. 19, 2011. Therein, FIGS. 6 to 9 largely correspond to FIGS. 1 to 4, but are adjusted so as to show the broken symmetry or "de-centered optical arrangements" or "de-centering optical arrangemenst" or optical arrangementd with "partially shifted optical components" or similar in one or both channels 20,30 which can lead to the before-discussed particular light distributions. Accordingly, details concerning manufacture and, with the above-mentioned exception, constitution can be taken from said U.S. provisional application 61/509, 346. Only a number of points shall in the following be explicitely discussed in the present application.

In FIG. 6, in the emission channel, the central axis emission AE of emitting member E is shifted parallely to the coinciding optical axes A2,A2' of passive optical component L2, and in the detection channel, the central axis detection AD of detecting member D is shifted parallely to the coinciding optical axes A3,A3' of passive optical component L3.

Passive optical components L2 and L3 are composed optical structures comprising optical structures 52 and 52', and 53 and 53', respectively; more specifically L2 and L3 are composed lenses comprising lens elements 52 and 52', and 53 and 53', respectively. (In said U.S. provisional application 1/509, 346, the optical structures and lens elements, respectively, are referred to by reference symbol 5 only.)

Figure 7:
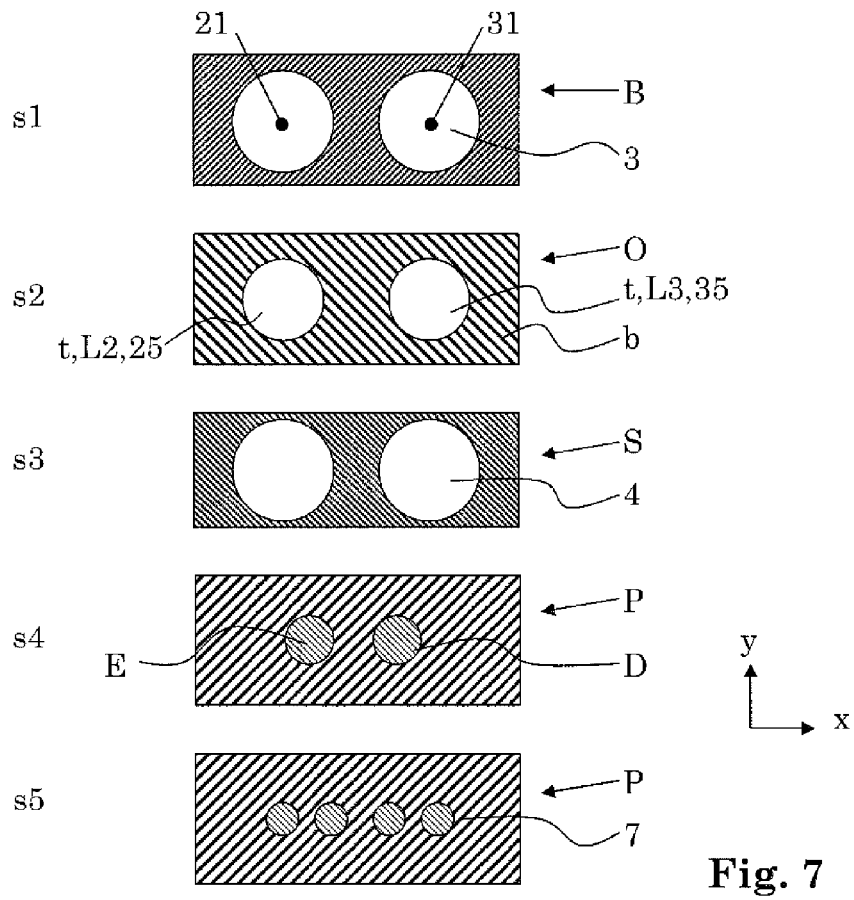
FIG. 7 various schematic cross-sectional views of constituents of the module of FIG. 6.

The following constituents of opto-electronic module 1 contribute to the housing 11 of opto-electronic module 1: Substrate P, separation member S (can also be referred to as a spacer), optics member O and baffle member B. They are all generally plate-like and usually also generally rectangular. This is also clear from FIG. 7 showing various schematic cross-sectional views of constituents of the module of FIG. 6; references s1 to s5 indicate where the views are taken in FIG. 6, the open arrows in FIG. 6 indicating the direction of view. The following constituents of opto-electronic module 1 contribute to what is also referred to as the isolating member 19 of opto-electronic module 1: Separation member S (can also be referred to as a spacer), optics member O and baffle member B.

Figure 8:
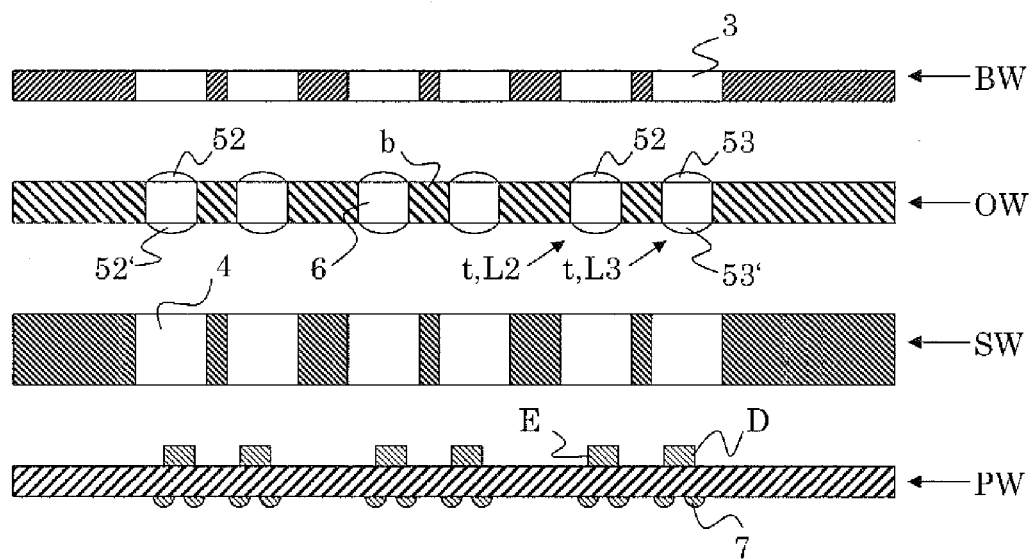
FIG. 8 a schematic cross-sectional view of wafers for forming a wafer stack for manufacturing a multitude of modules of FIG. 6.

FIG. 8 shows a schematic cross-sectional view of wafers BW (baffle wafer), OW (optics wafer), SW (spacer wafer), and PW (substrate wafer) for forming a wafer stack for manufacturing a multitude of modules of FIG. 6. Baffle wafer BW has transparent regions 3, e.g. openings; spacer wafer SW has openings 4; optics wafer OW comprises transparent elements 6 and blocking portions (or non-transparent portions) b, wherein passive optical components L2 and L3, respectively, comprising transparent elements 6 are provided in transparent portions t of optics wafer OW.

Figure 9:
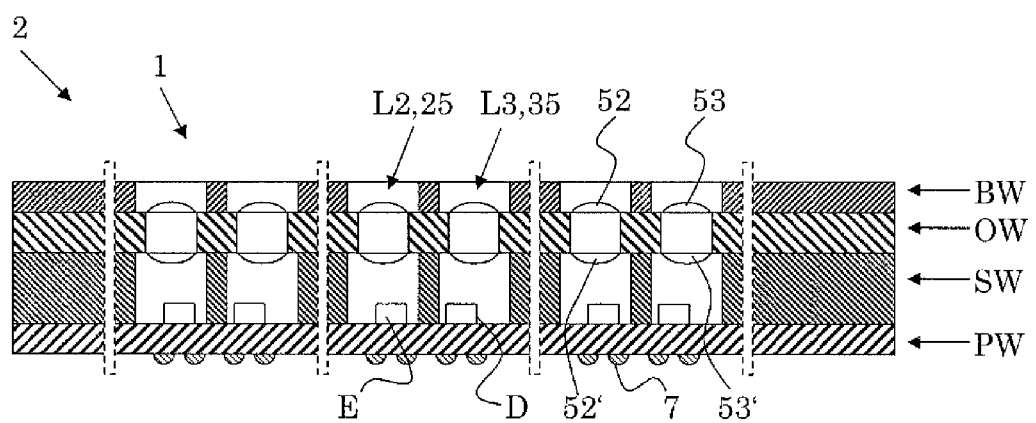
FIG. 9 a schematic cross-sectional view of a wafer stack for manufacturing a multitude of modules of FIG. 6.

FIG. 9 shows a schematic cross-sectional view of a wafer stack 1 for manufacturing a multitude of modules of FIG. 6.

It is, of course, generally possible to choose other ways of manufacturing opto-electronic modules 1 and also other ways of designing opto-electronic modules 1.

Figure 10:
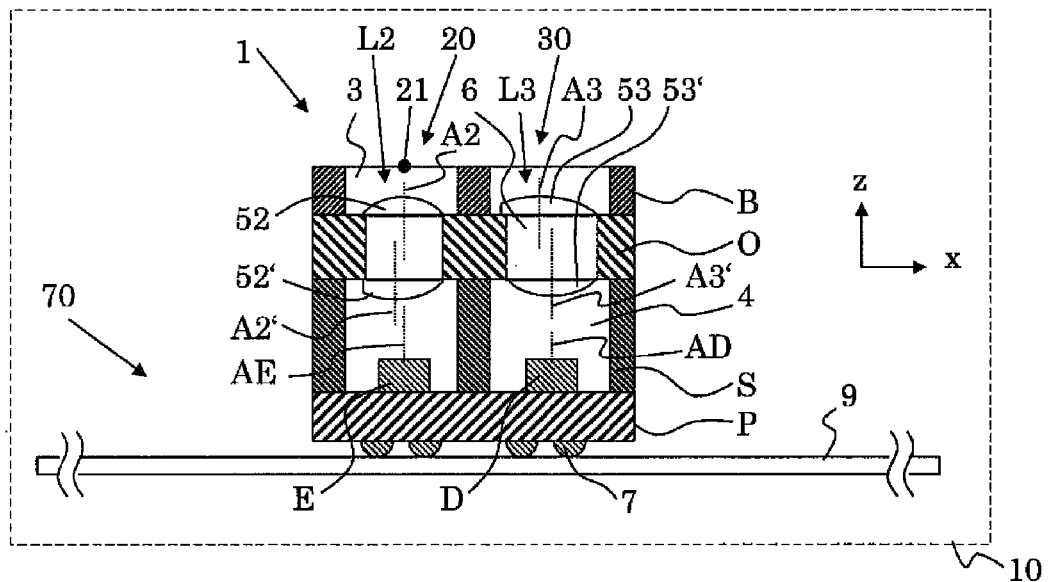
FIG. 10 a schematic cross-sectional view of an opto-electronic module and of an electronic circuit and of a device.
Figure 11:
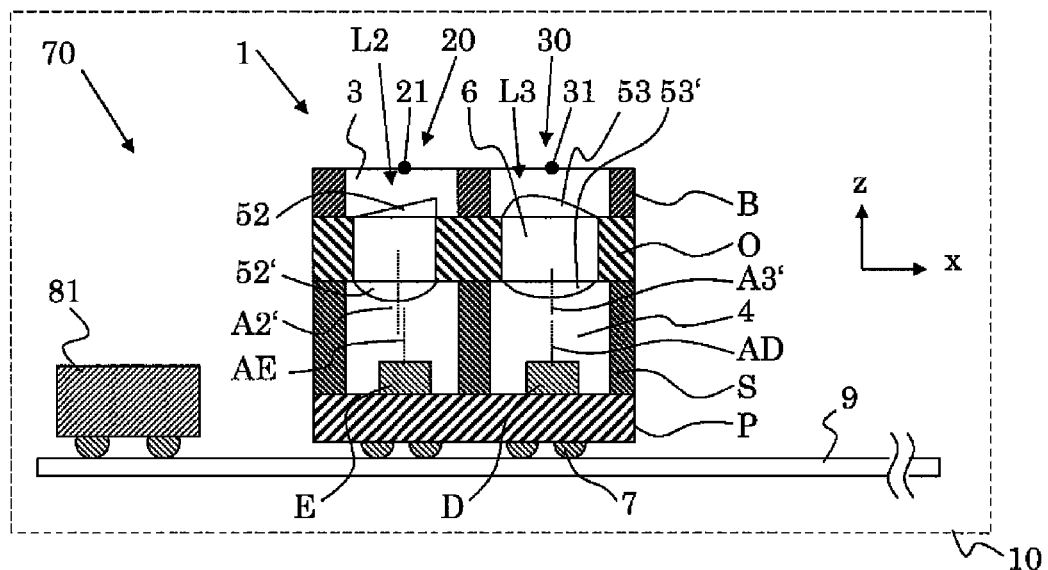
FIG. 11 a schematic cross-sectional view of an opto-electronic module and of an electronic circuit and of a device.

FIGS. 10 and 11 show schematic cross-sectional views of an opto-electronic module 1 and of an electronic circuit 70 and of a device 10, similarly as FIG. 6 does. But here, other ways of providing suitable light and sensivity distributions are illustrated. With respect to other properties of the opto-electronic module and its manufacturability, these embodiments are generally identical to the one of FIGS. 6 to 9.

In FIG. 10, in both channels, one optical structure or lens element (52 and 53', respectively) is centered with respect to emission member E and detecting member D, respectively, whereas another optical structure or lens element (52' and 53, respectively) is off-center with respect thereto, cf. the respective axes A2, A2', A3, A3', AE, AD. Furthermore, optical structures or lens elements 52' and 53 are cut. They are reduced in lateral extension at one side; in FIG. 10 by a cut along the y-z-plane. This can save space and make possible to move emission channel and detection channel closer to each other and reduce a lateral extension of opto-electronic module 1, thus making possible a smaller overall design of opto-electronic module 1.

The shifted position of optical structures can cause the presence of suitable intensity and sensivity distribution characteristics, respectively, which can result in a suppression of cross talk when opto-electronic module 1 is used together with an object, e.g., an object 18 as shown in FIGS. 1 to 3.

With optical structures being lenses, it is possible to make particularly efficient use of the light emitted by emission member E and of the sensitivity of detecting member D. The cut can allow the use of optical structures which could not be accommodated for size reasons if not cut, and it can contribute to the suppression of light travelling along paths which might enable cross-talk via reflection at an object (cf., e.g., FIGS. 1 to 3). Thus, the cut can also be beneficial (in particular by suppressing cross-talk) even if the optical structures of the respective channel are centralized (not shifted), more particularly if their respective optical axes not coinciding.

In FIG. 11, in the emission channel 20, optical structure 52 is embodied as a prism element. This prism element causes central and main emission directions to comprise a component pointing away from the detection channel 30. This way, cross-talk via reflection at an object (cf., e.g., FIGS. 1 to 3) can be suppressable. In the detection channel 30, optical structure 53 is a non rotationally symmetric lens such as an aspheric lens. This lens causes a non rotationally symmetric sensivity distribution of the detection channel, e.g., one with a main and a central detection direction having a component pointing away from the emission channel.

It is possible to combine the various ways of accomplishing the first and second aspects of the invention (cf. section "Summary of the Invention") illustrated in FIGS. 6, 10, 11 in other ways than shown there. Merely for brevity reasons, different such ways are illustrated in a combined fashion in the channels 20 and 30 in FIGS. 10 and 11. It can in certain situations be of advantage to provide a design symmetrical with respect to emission and detection channel, such as illustrated in FIGS. 1 and 6. A symmetrical design can as well be provided based on any one of the emission and detection channels illustrated in FIG. 10 or FIG. 11. And it is furthermore possible, in FIG. 10 as well as in FIG. 11, to arrange an upper optical structure (52, 53) in the lower position and vice versa a lower optical structure (52', 53') in an upper position. And it is also possible to provide passive optical components L2, L3 structured differently from those shown in the Figures, e.g., passive optical components being not-composed elements and/or having an upper or lower side describing a plane parallel to the x-y-plane. Of course, it is also possible to provide in one or both channels that (at least) three axes in a channel do not coincide and/or to provide in a channel (at least) two non-coinciding axes and in addition a non rotationally symmetric passive optical component (such as a prism, cf. reference 52 in FIG. 11, or a non rotationally symmetric lens, cf. reference 53 in FIG. 11).

Considering the small size of typically envisaged opto-electronic modules 1 of not more than some millimeters laterally and not more than a couple of millimeters vertically, the shift (in a lateral direction, in the illustrated embodiments along the x-axis) of axes, e.g., of an optical axis of a lens element with respect to an optical axis of another lens element or to a central axis of emission and detection, respectively, amounts usually to less than 200 µm, rather less than 100 µm and more particularly less than 60 µm and usually to more than 5 µm, more particularly more than 10 µm.

Figure 12:
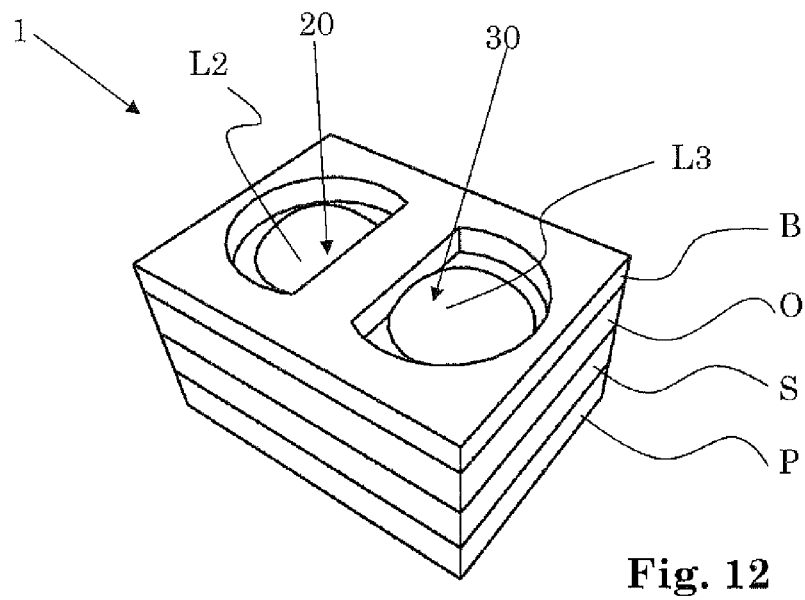
FIG. 12 a perspective view of an opto-electronic module.

FIG. 12 shows a perspective view of an opto-electronic module 1 which can be structured and/or manufactured generally like discussed in conjunction with FIGS. 1, 6, 10 and 11. The usefulness of the provision of cut lenses or cut lens elements is evident from FIG. 12. Also the usefulness of the provision of D-shaped transparent regions 3 in baffle member B is evident from FIG. 12. The exposed flat surface of baffle member B (having openings in the transparent regions 3) can well be used for a well-defined attachment the opto-electronic module 1 to an object, e.g., to an object like object 18 illustrated in FIGS. 1 to 3.

Figure 13:
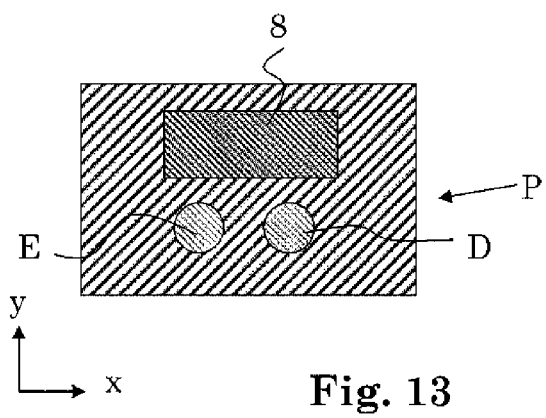
FIG. 13 a schematic cross-sectional view of constituents of an opto-electronic module.

FIG. 13 shows a schematic cross-sectional view of constituents of an opto-electronic module 1, namely of substrate P with emission member E and detecting member D mounted thereon and, in addition, with a control unit 8 mounted thereon. Control unit 8 can be embodied, e.g., as an integrated circuit. Control unit 8 is operationally connected to emission member E and detecting member D and can be provided for controlling emission member E and receive signals from detecting member D. In particular, control unit 8 can control the emission of light from emission member E and receive detection signals from detecting member D. Control unit 8 can also be configured for outputting control signals depending on detection signals outputted by detecting member D.

Figure 14:
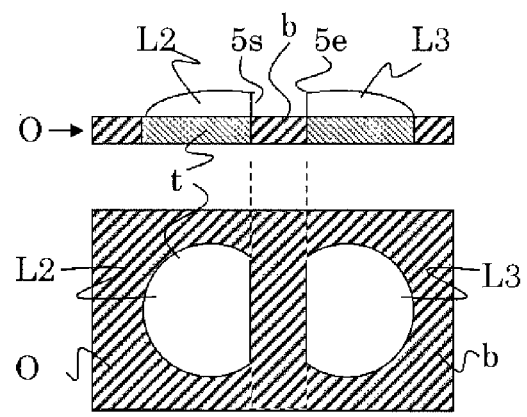
FIG. 14 a schematic illustration of an optics member in two views.

FIG. 14 is a schematic illustration of an optics member O in two views: cross-sectional view on top, top view below. This optics member O may be, e.g., one like usable in an opto-electronic module 1 as illustrated in FIG. 12—wherein it is possible to provide passive optical components on both sides of member O instead of, as illustrated, only on one side. Two passive optical components L2, L3 (more specifically lens elements L2, L3) are present on transparent portions t. They both are cut lenses or truncated lenses, cut or truncated along a straight line. These lines, and corresponding edges 5*e* and edge surfaces 5*s*, face the respective other channel and thus also face each other.

Lenses (or lens elements) L2 and L3 both have a lens aperture describing the shape of a circle a section of which has been replaced by a respective straight line. This results (in a lateral plane) in a shape at least approximately describing a capital letter "D". Optical axes of these typically spherical lenses may thus be very close to each other.

As will have become clear from the above, there are various ways of implementing realizing the first (light-distribution-related) and/or the second (component-related) aspect of the invention. A certain beneficial light distribution and/or sensitivity distribution can be realized by one or more implementations and/or arrangements of active and passive optical components. And certain components and/or arrangements thereof can allow to realize specific beneficial light and/or sensitivity distributions. It has been demonstrated how beneficial beam shaping (for light emission and for light detection) can be applied. Reflection at nearby (partially) reflective surfaces can be kept from establishing cross-talk from the emission channel to the detection channel. Further cross-talk minimization can be achieved by providing a suitably designed housing with an isolating member and/or a housing forming separate compartments for the channels.

The provision of one or more lens elements (diffractive or refractive) in one or both channels can contribute to a high sensitivity and safe operation and to a low power consumption, since emitted light can be collimated, and/or light for detection can be gathered from a large solid angle.

The provision of both, emission member and detecting member in one opto-electronic module can contribute to a largely simplified integration of the opto-electronic module in an electro-optical arrangement and in a device, respectively, and the provision of an integrated mechanical stop like provided by the baffle member also contributes thereto Each of these and in particular the provision of both, mechanical stop and integration of emission and of detecting member, also contributes to a simplified way of achieving a high-precision alignment of the opto-electronic module in an electro-optical arrangement and in a device, respectively. If the device and/or an object to which the opto-electronic module is to be attached is of sufficiently high precision or sufficiently well defined, and the opto-electronic module has been designed accordingly, the opto-electronic module is readily integrated with high precision. This can industrial production render individual testing superfluous; it can be assumed that each opto-electronic module attached in a device will work according to specifications.

Achieving a safe operation with sufficient sensitivity and sufficient cross-talk suppression requires a high alignment precision of the constituents of the opto-electronic module, but such a high alignment precision can be reached making use of wafer-level manufacturing methods as indicated.

Other implementations are within the scope of the claims.

What is claimed is:

1. A proximity sensor module comprising:
   a substrate on which are mounted a light emitting device and a light detecting device, wherein the light emitting device has a central axis of emission in a first optical channel and the light detecting device has a central axis of detection in a second optical channel;
   a plurality of passive optical components in the first optical channel and having respective optical axes that do not coincide with one another, wherein a first one of the passive optical components in the first optical channel is disposed on a first side of an optics member, and a second one of the passive optical components in the first channel is disposed on a second side of the optics member; and
   a plurality of passive optical components in the second optical channel and having respective optical axes that do not coincide with one another, wherein a first one of the passive optical components in the second optical channel is disposed on the first side of the optics member, and a second one of the passive optical components in the second channel is disposed on the second side of the optics member,
   the proximity sensor module further comprising a spacer that separates the substrate and the optics member from one another.

2. The proximity sensor module of claim 1 wherein the light emitting device is a LED that has a central axis of emission that intersects the passive optical components in the first optical channel, and the light detecting device is a photodiode that has a central axis of detection that intersects the passive optical components in the second optical channel.

3. The proximity sensor module of claim 1 wherein the passive optical components in the first optical channel and the passive optical components in the second optical channel comprise lenses.

4. The proximity sensor module of claim 1,
   wherein the passive optical components in the first optical channel include a first lens and a second lens, wherein an optical axis of the first lens is substantially aligned with the central axis of emission, and wherein an optical axis of the second lens is offset with respect to the central axis of emission, and
   wherein the passive optical components in the second optical channel include a first lens and a second lens, wherein an optical axis of the first lens is substantially aligned with the central axis of detection, and wherein an optical axis of the second lens is offset with respect to the central axis of detection.

5. The proximity sensor module of claim 4 wherein the first lens in the first optical channel is further from the light emitting device than the second lens in the first optical channel, and wherein the first lens in the second optical channel is further from the light detecting device than the second lens in the optical channel.

6. The proximity sensor module of claim 1 wherein at least one of the passive optical components in the first optical channel and at least one of the passive optical components in the second optical channel include an edge that has a non-circular portion.

7. The proximity sensor module of claim 6 wherein the non-circular portion of the at least one of the passive optical components in the first optical channel and the non-circular portion of the at least one of the passive optical components in the second optical channel face toward one another.

8. The proximity sensor module of claim 1 further including a separation member that at least partially separates the first and second optical channels from one another, wherein the separation member impedes propagation of light from the light emitting device to the light detecting device.

9. The proximity sensor module of claim 1 further including a separation member that at least partially separates the first and second optical channels from one another, wherein the separation member is composed of a material that is substantially non-transparent to a spectrum of light emitted by the light emitting device and detectable by the light detecting device.

10. A sensor module comprising:
a substrate on which are mounted a LED and a photodiode;
a plurality of lenses that intersect a central axis of emission of the LED and have respective optical axes that do not coincide with one another, and wherein the optical axis of one of the lenses that intersects the central axis of emission of the LED is offset with respect to the central axis of emission of the LED by an amount in the range of 10 μm-100 μm; and
a plurality of lenses that intersect a central axis of detection of the photodiode and have respective optical axes that do not coincide with one another, and wherein the optical axis of one of the lenses that intersects the central axis of detection of the photodiode is offset with respect to the central axis of detection of the photodiode by an amount in the range of 10 μm-100 μm.

11. The sensor module of claim 10 wherein at least one of the lenses that intersects the central axis of emission of the LED has a cut edge, and wherein at least one of the lenses that intersects the central axis of detection of the photodiode has a cut edge.

12. The sensor module of claim 11 wherein the cut edges of the lenses face toward one another.

13. The sensor module of claim 10 wherein the lenses intersecting the central axis of emission of the LED and the lenses intersecting the central axis of detection of the photodiode are attached to an optics member, the sensor module further including a spacer between the optics member and the substrate on which the LED and photodiode are mounted.

14. The sensor module of claim 13 wherein the spacer also separates the LED and photodiode from one another.

15. The sensor module of claim 14 wherein the LED and the lenses intersecting the central axis of emission of the LED are disposed in a first optical channel, and wherein the photodiode and the lenses intersecting the central axis of detection of the photodiode are disposed in a second optical channel, and
wherein the sensor module further includes a separation member that at least partially separates the first and second optical channels from one another, wherein the separation member is composed of a material that is substantially non-transparent to light emitted by the LED and detectable by the photodiode.

16. The sensor module of claim 15 further including a baffle disposed over the separation member and at least partially separating the first optical channel from the second optical channel.

17. The sensor module of claim 15, the sensor module including sides composed of a material that is substantially non-transparent to light emitted by the LED and detectable by the photodiode.

18. The sensor module of claim 17 wherein said sides of the sensor module are composed of the same material as the separation member that at least partially separates the first and second optical channels from one another.

19. A proximity sensor module having a first optical channel and a second optical channel, the module comprising:
a printed circuit board substrate on which are mounted a LED and a photodiode, wherein the LED is arranged to emit light into the first optical channel and the photodiode is arranged to detect light from the second optical channel;
an optics member;
a pair of lenses on the optics member and disposed in the first optical channel, and a pair of lenses on the optics member and disposed in the second optical channel;
a spacer disposed between the printed circuit board and the optics member; and
sides composed of a material that is substantially non-transparent to a spectrum of light emitted by the LED and detectable by the photodiode,
wherein at least one lens from the pair of lenses disposed in the first optical channel has an optical axis that is offset with respect to a central axis of emission of the LED, and wherein at least one lens from the pair of lenses in the second optical channel has an optical axis that is offset with respect to a central axis of detection of the photodiode.

20. The proximity sensor of claim 19 wherein one lens from each pair of lenses is disposed on a first side of the optics member, and the second lens from each pair of lenses is disposed on an opposite second side of the optics member.

21. The proximity sensor of claim 20 wherein at least a section of the optics member that intersects the central axis of emission and a section of the optics member that intersects the central axis of detection are composed of a material that is transparent to the spectrum of light emitted by the LED and detectable by the photodiode.

22. The proximity sensor of claim 20 wherein the first side of the optics member is closer to the printed circuit board substrate than the second side of the optics member,
wherein the lens in the first channel whose optical axis is offset with respect to the central axis of emission of the LED is disposed on the first side of the optics member, and wherein the lens in the second channel whose optical axis also is offset with respect to the central axis of detection of the photodiode is disposed on the first side of the optics member.

23. The proximity sensor of claim 22 wherein each of the lenses on the second side of the optics member has a cut edge.

24. The proximity sensor of claim 22 wherein each of the lenses on the second side of the optics member has an edge including a non-circular portion.

25. The proximity sensor of claim 19 wherein an emission axis of the first optical channel diverges away from a detection axis of the second optical channel.

26. The proximity sensor of claim 19 wherein the optical axis of the lens in the first optical channel that is offset with respect to the central axis of emission of the LED is offset by an amount in the range of 10 μm-100 μm, and wherein the optical axis of the lens in the second optical channel that is offset with respect to the central axis of detection of the photodiode is offset by an amount in the range of 10 μm-100 μm.

27. A hand-held communication device comprising:
a display screen; and
a proximity sensor module including:
    a substrate on which are mounted a LED and a photodiode, wherein the LED has a central axis of emission and the photodiode has a central axis of detection;
    passive optical components that intersect the central axis of emission and that have respective optical axes that do not coincide with one another, wherein a first one of the passive optical components in a first optical channel is disposed on a first side of an optics member, and a second one of the passive optical components in the first channel is disposed on a second side of the optics member; and
    passive optical components that intersect the central axis of detection and that have respective optical axes that do not coincide with one another, wherein a first one of the passive optical components in a second optical channel is disposed on the first side of the optics member, and a second one of the passive optical components in the second channel is disposed on the second side of the optics member,
    the proximity sensor module further comprising a spacer that separates the substrate and the optics member from one another.

28. The hand-held communication device of claim 27 wherein the optical axis of one of the passive optical components that intersects the central axis of emission of the LED is offset with respect to the central axis of emission of the LED, and the optical axis of one of the passive optical components that intersects the central axis of detection of the photodiode is offset with respect to the central axis of detection of the photodiode.

29. The hand-held communication device of claim 27 wherein the optical axis of one of the passive optical components that intersects the central axis of emission of the LED is offset with respect to the central axis of emission of the LED by an amount in the range of 10 μm-100 μm, and the optical axis of one of the passive optical components that intersects the central axis of detection of the photodiode is offset with respect to the central axis of detection of the photodiode by an amount in the range of 10 μm-100 μm.

30. The hand-held communication device of claim 27 wherein at least one of the passive optical components that intersects the central axis of emission of the LED has a cut edge, and wherein at least one of the passive optical components that intersects the central axis of detection of the photodiode has a cut edge.

* * * * *

UNITED STATES PATENT AND TRADEMARK OFFICE
CERTIFICATE OF CORRECTION

| | | |
|---|---|---|
| PATENT NO. | : 8,674,305 B2 | Page 1 of 1 |
| APPLICATION NO. | : 13/926058 | |
| DATED | : March 18, 2014 | |
| INVENTOR(S) | : Markus Rossi and Ville Kettunen | |

It is certified that error appears in the above-identified patent and that said Letters Patent is hereby corrected as shown below:

In the Claims

Column 24

Claim 20, line 38, after "sensor" insert -- module --.

Column 24

Claim 21, line 42, after "sensor" insert -- module --.

Column 24

Claim 22, line 48, after "sensor" insert -- module --.

Column 24

Claim 23, line 58, after "sensor" insert -- module --.

Column 24

Claim 24, line 60, after "sensor" insert -- module --.

Column 24

Claim 25, line 63, after "sensor" insert -- module --.

Column 24

Claim 26, line 66, after "sensor" insert -- module --.

Signed and Sealed this
Fifteenth Day of December, 2015

Michelle K. Lee
*Director of the United States Patent and Trademark Office*